Patented Dec. 25, 1945

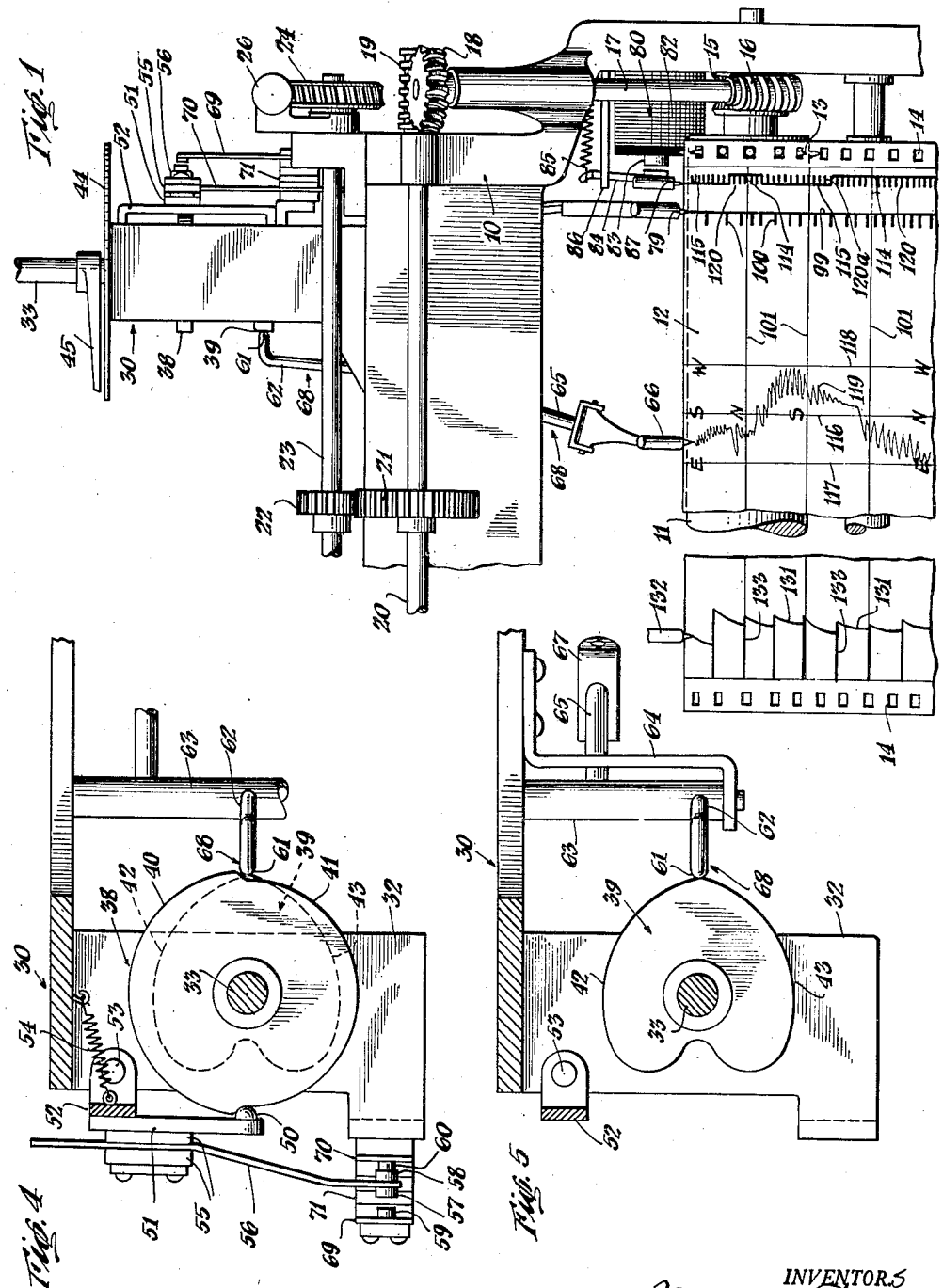

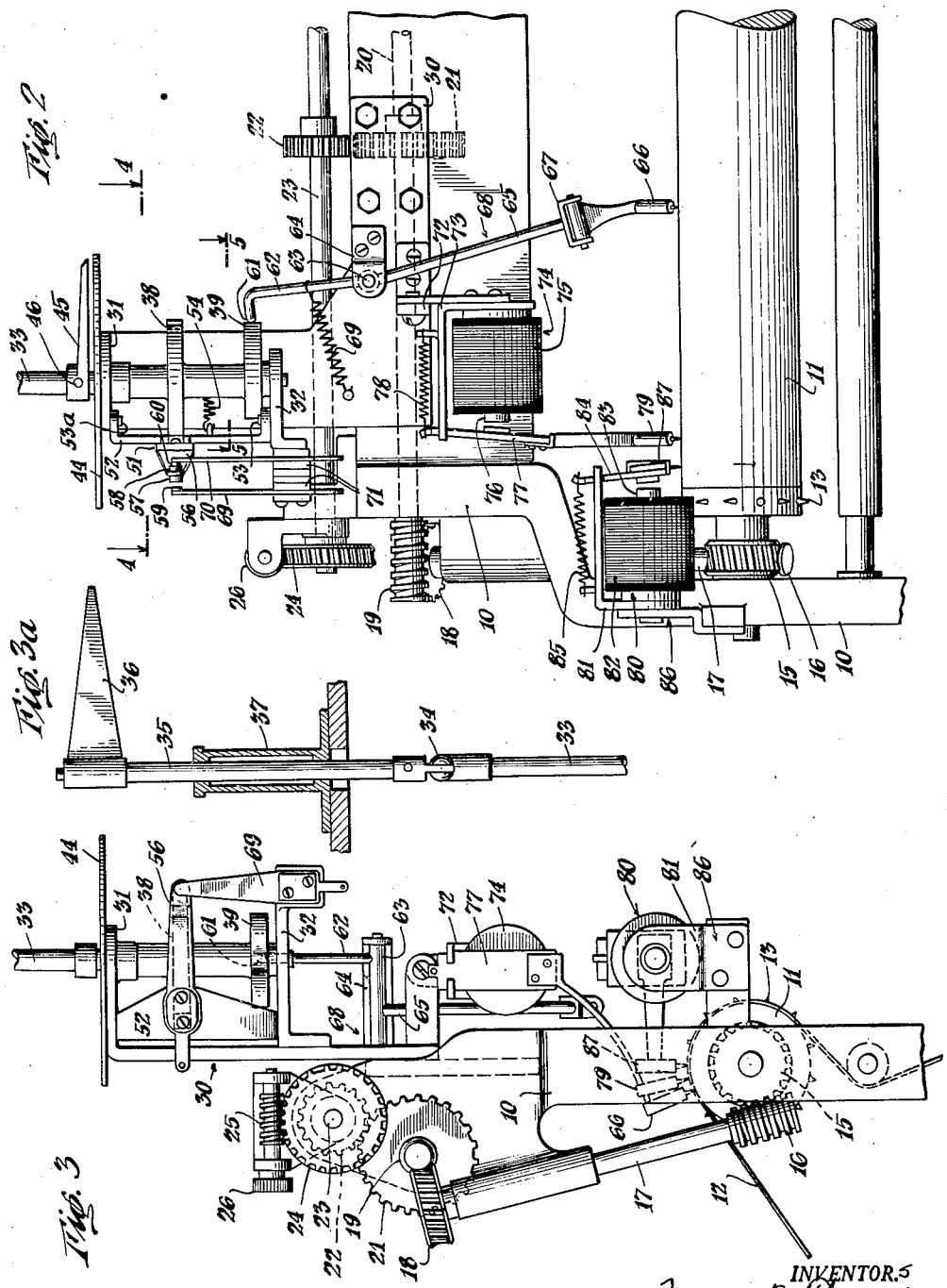

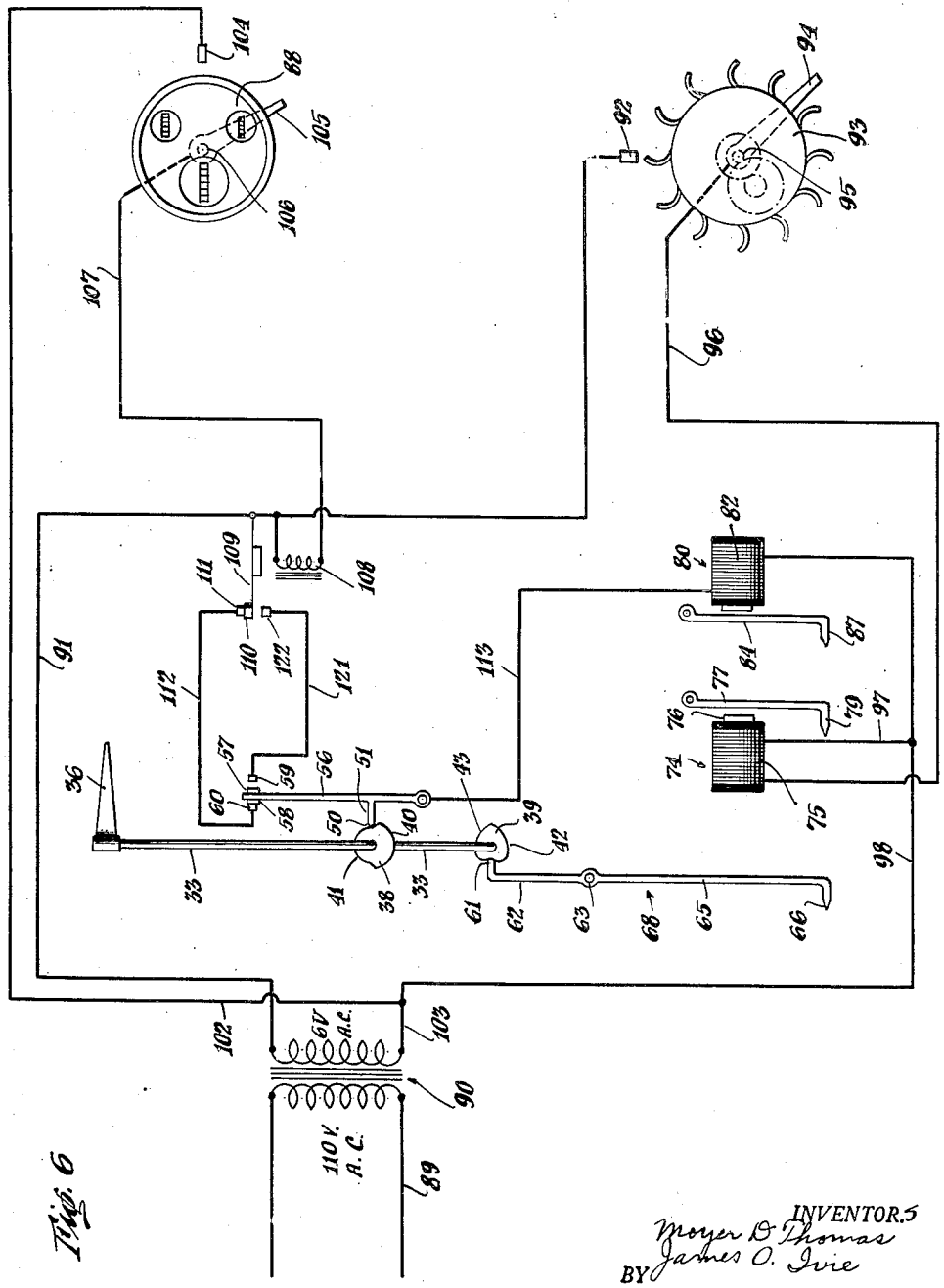

2,391,601

UNITED STATES PATENT OFFICE 2,391,601

WIND RECORDING APPARATUS

Moyer D. Thomas and James O. Ivie, Salt Lake City, Utah, assignors to American Smelting and Refining Company, New York, N. Y., a corporation of New Jersey Application September 21, 1943, Serial No. 503,212

7 Claims. (Cl. 73—189)

This invention relates generally to recording devices and more particularly to apparatus for measuring and recording wind direction and velocity.

It is frequently desirable in connection with systems for automatically measuring and recording small concentrations of sulphur dioxide in the atmosphere to know, in addition to the amount of $SO_2$ in the atmosphere at particular times or over an extended period of time, the direction and velocity of the wind when the concentration of the $SO_2$ is being measured and recorded.

In some systems for measuring the $SO_2$ concentrations in the atmosphere there is provided automatic apparatus which periodically aspirates measured amounts of the air being tested through measured quantities of standard reagents and means are provided for measuring the effect of the aspirated air on the reagent, such as, a pair of electrodes, the resistance between which is measured and recorded by suitable apparatus. Recording devices for this purpose may be of any suitable standard types such, for example, as a Leeds & Northrup recorder. By the use of an automatic recorder of the kind mentioned a strip of ruled paper is driven over a cylinder at a predetermined constant speed in timed relation with the operation of the aspirating absorption apparatus and one or more recording styluses operating in response to the current flowing through the gas absorbing reagent makes a running record which may be related by suitable calibration to the current resistance so as to indicate the amount of $SO_2$ in the atmosphere and in some instances, other volatile sulphur compounds.

According to this invention there is provided apparatus adapted to measure and record wind velocity and direction which may be used independently of the devices for measuring and recording small concentrations of gases in the atmosphere but preferably it is used as a part of, or in combination with systems for measuring, indicating and recording gas concentrations in the atmosphere. When used in conjunction with or as a part of a gas concentration recording system, the invention provides apparatus for producing a currently or continuously running indication for any desired period of time, which, in addition to indicating and recording the concentrations of gases in the atmosphere also indicates and records at the same time the wind velocity and direction at the place where the atmosphere is being tested. Consequently, there may be automatically produced a permanent chart or graph of the various factors and conditions mentioned.

According to one form of the system of the invention, a rotatable shaft is connected through a universal joint to a sensitive standard wind vane. Mounted on the shaft is a wind direction cam which operates a wind direction lever carrying a recording stylus to record wind direction on a moving paper strip carried by a standard recording device. Also mounted on the same shaft is a wind direction orientation cam which operates a single pole double throw electrical switch arranged to operate another recording stylus. The arrangement is such that each half revolution of the wind direction cam causes the wind direction stylus or pen, which is mounted on a pivoted lever, to travel a full arc on the recording paper. The wind direction orientation stylus or pen operates in response to rotation of the wind direction orientation cam to indicate in which 180° arc of 360° the wind direction is. Another stylus is arranged to be operated in response to the movement of a standard anemometer to record wind velocity. By a special wiring circuit in the system the arrangement is such that wind direction, wind velocity and amount of air tested in the absorption apparatus may be currently or continuously indicated and recorded on the recording paper.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a partial front view in elevation of a recording device embodying the invention partly broken away but showing styluses for recording wind direction and velocity and volume of air aspirated and showing also the type of chart produced;

Fig. 2 is a partial rear view in elevation of the device shown in Fig. 1 partly broken away but with the chart paper removed;

Fig. 3 is an end view of the device shown in Figs. 1 and 2 partly broken away;

Fig. 3a is a view showing a wind vane and shaft, broken away, which is connected to the apparatus shown in Figs. 1, 2 and 3;

Fig. 4 is a view on line 4—4 of Fig. 2;

Fig. 5 is a view on line 5—5 of Fig. 2; and

Fig. 6 is a schematic diagram to illustrate the system including the wiring hook up.

In the drawings, in which like reference characters denote like parts in the several figures, certain specific disclosure of a preferred form of the invention is made for purposes of explanation, but it will be understood that the details may be modified in various respects without departure from the invention in its broader aspects.

Referring now to the drawings, 10 represents the main frame of a typical recording device. Mounted for rotation in the frame is a cylinder 11 over which travels a strip of chart paper 12 at a predetermined rate of speed. The cylinder 11 is provided at both ends with circumferentially arranged teeth 13 which register with corresponding rows of apertures 14 in the strip 12. The cylinder 11 is driven through a gear 15 fixed to the shaft of cylinder 11, which gear meshes with worm 16 fixed to shaft 17 having a gear 18 meshing with worm 19 on shaft 20. The mechanism is driven in a known manner. A gear 21 on shaft 20 meshes with a pinion 22 on shaft 23 which is provided with a gear 24 meshing with a worm 25 having a knob 26 for delicately adjusting the position of the cylinder 11 and the engaged strip 12 for desired relative position between the recording pens of the recorder and the ordinates of the chart paper. So much of the apparatus as has been described is standard and further detail is deemed unnecessary.

Mounted on the main frame 10 is a frame, designated generally by reference character 30, which supports horizontal brackets 31 and 32. Mounted for rotation in suitable bearings in the brackets is a vertical shaft 33. This shaft is connected by means of a universal joint 34 to wind vane shaft 35 which is connected to a wind vane 36 which may be of any desirable standard construction. A bearing 37 may be provided as desired for mounting the wind vane shaft 35 for rotation. It will be understood the wind vane will be exposed to the wind where the apparatus is set up.

Fixedly but adjustably mounted on shaft 33 between the brackets 31 and 32 are two cams, one herein designated, for facilitating description, as the wind direction orientation cam or north-south sector cam 38 and the other, the wind direction cam 39. Cam 38 has a high cam track section 40 through 180° and a low cam track section 41 through the other 180° (see Fig. 4). Cam 39 is heart shaped and has one lobe 42 corresponding to the high section 40 of cam 38 and the other lobe 43 corresponding to the low section 41 of cam 38. The relative positions of the two cams are shown in Figs. 3 and 4.

A disc 44 is mounted above bracket 31. It has a circumferential scale graduated in quadrants or degrees as in a compass rose. A pointer 45 adjustably fixed to shaft 33, as by set screw 46, registers with the graduated scale. The pointer is operated above the disc in response to rotation of the shaft to which the weather vane is attached. This arrangement is a convenience in setting up the device and in calibrating the response of the wind direction recording pen to the movement of the vane.

Engaging the cam track of cam 38 is a cam follower 50 on cam lever 51. The opposite end of lever 51 is fixed to a bracket 52 mounted for rotation on pivot 53 on bracket 32 and a corresponding pivot 53a on bracket 31. A spring 54 yieldingly urges the cam follower 50 against the cam 38 (see Fig. 4). Mounted on the lever 51 between insulating blocks 55 is a switch arm 56 of resilient conducting material. The free opposite end of switch arm 56 is provided with contact member 57 adapted on actuation of lever 51 to engage contact member 59 when the cam follower 50 is on the high cam track section 40 and a contact member 58 adapted to engage contact member 60 when the cam follower 50 is on the low cam track section 41. The contact members are mounted in spaced relation on the bracket 32 as shown in Fig. 4. This arrangement of the switch arm and contact members, it may be noted, provides a single pole double throw switch, the purpose of which is referred to in more detail hereinafter. The contact members 59 and 60 are mounted in spaced relation on conducting arms 69 and 70 respectively which are in turn mounted between insulating blocks 71 secured to the bracket 32 (see Fig. 2).

Engaging the cam 39 is a cam follower 61 on cam lever 62 which is mounted on a shaft 63 pivotally mounted in a bracket 64 secured to the frame 30 as by screws. The other section 65 of the lever is secured to the shaft 63. Thus, there is provided a pivotally mounted wind direction lever, designated generally by reference character 68. This lever mounts a recording pen 66 by means of a hinged connection 67. It will be observed the pen 66 engages the chart paper 12 and makes a mark thereon corresponding to its movement over the paper (see Fig. 1), which is responsive to the movement of the cam follower 61 engaging cam 39 (see Fig. 2). A spring 69 yieldingly urges the cam follower against the cam 39.

Also secured to the frame 30 is a bracket 72 mounting a yoke 73 which supports an electromagnet 74, comprising winding 75, and core 76. An armature arm 77 is mounted on the yoke to provide a lever, one end of which is attached to a spring 78 which normally holds the armature in "dropped" or out-of-contact position when the winding is not energized. When the magnet is energized the spring yields and the armature is "lifted" and makes contact with the core. Hence, the pen 79 herein designated for purposes of description as the wind velocity pen, which is secured to the armature arm 77 will make a lateral mark on the chart paper 12 in response to the movement of the armature of the electromagnet. The wind velocity electromagnet 74 is wired to a standard wind velocity anemometer (shown diagrammatically in Fig. 6) and the arrangement is such that the wind velocity pen registers on the chart the passage of each mile of wind by being drawn to one side at the time when the armature 77 is "lifted" to contact position.

Mounted on the frame 10 is another bracket 86 supporting electromagnet 80 which comprises a yoke 81 mounting the magnet having a winding 82, core 83, and armature 84. The armature is yieldingly urged to out-of-contact or "dropped" position by a spring 85. A recorder pen 87, herein designated for purposes of description as the wind direction orientation pen, is fixed to armature arm 84 and engages the chart paper 12 on cylinder 11. When the magnet 80 is energized the armature will be in lifted or contact position and the pen will make a mark longitudinally of the strip 12 corresponding to the energized position and when de-energized, the pen will be drawn slightly to the left as viewed in Fig. 1 and so long as de-energized will make a mark longitudinally of the strip 12 to the left of the marked line corresponding to the dropped or out-of-contact position.

The magnet 80 is wired to the gas or air volume meter of the SO₂ measuring and recording apparatus and also wired to be operated by the wind direction orientation cam 38. The gas or air meter 88 is shown diagrammatically in Fig. 6 and is wired to the same magnet 80 and the arrangement is such that upon passage of each unit volume of air through the aspirating apparatus (not shown) the pen 87 is drawn laterally to one side or the other of the longitudinal line indicating wind direction orientation. Accordingly, pen 87 indicates and records not only a mark indicating the wind direction whether generally north or south but also indicates and records the amount of air passing through the aspirating apparatus to which the meter is connected.

The apparatus is wired as shown by the wiring diagram in Fig. 6 wherein is also shown schematically certain working elements and parts of the apparatus, the reference characters being insofar as practicable the same as those of the other figures of the drawings.

The operation of the system may be better understood by reference to Fig. 6 together with the other figures. By means of a transformer 90, a source 89 of 110 v. alternating current is reduced to, say 6 v. Wire 91 is connected to a contact member 92 on the anemometer 93. It will be understood the anemometer may be of any suitable standard type and is equipped to make electrical contact on each passage of a mile of wind. As the anemometer rotates in response to wind current, the conducting arm 94 rotates on axis 95 and on each revolution it represents one mile of wind. Anemometer contact arm is connected to wire 96 which is connected through winding 75 of electromagnet 74, thence to wire 97, connected to wire 98.

Normally wind velocity armature 77 will be in out-of-contact position and will make a line 99 running longitudinally or parallel with the length of paper strip 12 (see Fig. 1). Upon rotation of the contact arm 94 of the anemometer (see Fig. 6) it will make contact with contact member 92 upon the passage through the anemometer of each mile of wind. At the time of contact, current passes through wires 91, arm 94, wire 96 through the winding 75 of magnet 74 to energize it, through wires 97 and 98. Upon energization, armature 77 is "lifted" to contact position drawing the pen 79 momentarily to the left as viewed in Fig. 1. When contact is broken the pen 79 returns to normal position. Consequently each laterally extending mark 100 indicates the passage of one mile of wind. Inasmuch as the strip 12 passes under the pen at a uniform predetermined or adjusted lineal speed, the velocity of the wind at any given time may be determined by reference to the printed ordinate lines 101.

Referring again to Fig. 6, wire 102, connected to wire 103, to which is also connected 98, is a contact member 104 on the gas or air meter 88. It will be understood that the gas meter 88 is arranged to measure the quantity of air passing through the air aspirating apparatus (not shown). Ordinarily meters used for this purpose indicate one cubic foot of gas per each revolution of the main indicator hand, although, of course, other meters may be utilized. Accordingly, the arrangement shown is such that upon each revolution of contact arm 105, one cubic foot of air passes through the meter. Contact arm 105 is of conducting material and rotates on axis 106.

The arm 105 is electrically connected to wire 107 which is connected to a relay 108. Relay contact arm 109 is normally out of contact or in dropped position and the contact member 110 normally makes contact with contact member 111 connected to wire 112. Wire 112 also connects with contact member 60 (see also Figs. 2 and 4). It may be here noted that when cam follower 50 engages the lower half section 41 of wind direction orientation cam 38, contact member 58 on switch arm 56 engages contact member 60 and current will flow through switch arm 56 which is connected to wire 113 through winding 82 of wind direction orientation magnet 80, and through wire 98 connected to wire 103 to the transformer. Hence, magnet 80 is normally energized when the cam follower 50 engages the low cam track section 41. When magnet 80 is thus energized the armature 84 is in "lifted" or contact position and pen 87 will make a mark 114 along the paper strip 12 to right as viewed in Fig. 1. When the magnet 80 is de-energized the pen 87 will make a mark 115 along the paper, to the left as viewed in Fig. 1. For example, when the cam follower 50 engages the high cam track section 40 of cam 38 the lever 51 causes switch arm 56 to move away from the cam and causes contact between contact members 57 and 59, but in that case normally no current will flow through magnet 80 and armature 84 is in "dropped" or out-of-contact position and the wind direction orientation pen 87 will make a mark 115 parallel with the length of the strip to the left as viewed in Fig. 1.

The wind direction pen 66 it will be observed is operated in response to the movement of wind direction lever 68 which rocks on pivot 63 (see Fig. 2). As the heart-shaped cam 39 is rotated with shaft 33 is response to the position taken by the wind vane 36, cam follower 61 on lever 68 engages either the cam track section 42 or 43. When the cam follower 61 engages the point on the cam nearest the axis of rotation of the cam the pen 66 swings to its furthest point on the chart to the left as viewed in Fig. 1, for example to line 117, which indicates the wind direction is east. When the cam follower 61 engages the point on the cam at the point of the heart-shaped cam which is furthest from its axis, the pen swings to the right as viewed in Fig. 1, for example to line 118, its furthest position to the right which indicates the wind direction is west. Inasmuch as the wind may be in a direction which is, for example, N. E. or N. W., and inasmuch as some arrangement is necessary to indicate whether the cam follower is engaging lobe 42 or 43 to determine whether the wind direction generally is north or south, the low section 41 of cam 38 corresponds to lobe 43 and the high section 40 of cam 38 corresponds to lobe 42. Hence, when cam follower 50 is on the low side 41, cam follower 61 is on lobe 43 and since contacts 58 and 60 are thus engaged, current is normally flowing through winding 82 of magnet 80, this magnet is energized and pen makes a mark 114 (see Figs. 1 and 6). Accordingly, the mark made by pen 66 opposite mark 114 on the chart indicates the wind direction is generally north. If the wind direction is directly north the pen 66 will register on the center line 116 which may conveniently be printed on the chart as well as the ordinates 101. If the wind direction is N. E., the pen 66 will swing to the left of the center line 116. Accordingly, by taking into consideration the furthest distance to the left (as viewed in Fig. 1), the pen 66 can swing, it is an easy matter to determine how far east from N. the wind is blowing. Likewise, if the wind direction is N. W., the pen 66 swings to the right of line 116.

On the other hand, if the wind direction is generally south, the high section 49 of cam 38 engages cam follower 50 and lobe 42 of cam engages cam follower 61. Under this set of conditions electrical contacts 58 and 60 are disengaged and current is not normally flowing through winding 82 of magnet 80 which is then normally de-energized. Under this set of conditions pen 87 will make a mark 115 parallel with the length of the paper strip 12, to the left of mark 114. This indicates the wind is blowing in a generally south direction. If pen 66 is on center line 116 opposite mark 115, this indicates the wind direction is due south. If the pen swings to the left of line 116, it indicates S. E. and how much east of south can be determined by reference to line 117 the furthest to the left the pen can swing. Likewise, when pen 66 swings to the right of line 116, it indicates how much to the west of south the wind direction is.

Summarizing briefly, by observing the graph 119 made by pen 66 and noting whether the mark made by pen 87 is to the right (mark 114) or the left (mark 115), it can be determined whether the wind direction at any time was in the N. E. or N. W. quadrant or the S. E. or S. W. quadrant of the compass rose and also the exact wind direction may be determined from the chart.

Pen 87 may also be utilized to serve an additional purpose, to wit, indicate and record the amount of air aspirated through the $SO_2$ testing apparatus (not shown). It will be understood the gas meter 88 (see Fig. 6) is connected to measure the quantity of air passing through the absorption or aspirating apparatus. Usually, each revolution of the large hand of the meter indicates the passage of one cubic foot of air. According to the invention, contact arm 105 makes contact with contact member 104 for each revolution corresponding to one cubic foot of air passing through the meter. At the time of contact, current will flow through wire 102, contact arm 105, wire 107, through relay coil 108, and wire 91 to energize the relay coil and cause contact arm 109 to break the contact between contacts 110 and 111.

Hence, when cam follower 50 is on low side 41 of cam 38 (when pen 87 is to the right to make mark 114—see Fig. 1 and Fig. 6) contact of members 104 and 105 causes break of contacts 110 and 111 and at that time the circuit through winding 82 of magnet 80 is momentarily broken, and the magnet 80 momentarily de-energized. At this moment, armature 84 is "dropped," the pen 87 makes a lateral mark 120 and then returns to continue mark 114 along the length of the paper, since breaking of contact between contact member 104 and arm 105 of the meter permits armature arm 109 to return to normal position to complete the circuit flowing current through winding 82. It will thus be observed that each short lateral mark 120 on the chart indicates the passage of one cubic foot of gas through the absorption apparatus. Since the paper strip moves linearly at uniform speed the marks parallel with the length of the paper strip correspond to abscissae representing time, the lines 101 running crosswise having been referred to as ordinates. Consequently, the volume of gas tested is shown on the chart by the short lateral lines made by pen 87.

In the event that cam follower 50 engages cam section 40, that is when pen 87 is to the left making mark 115, it will be observed that magnet 80 is normally deenergized. However, contact member 57 engages contact member 59 which is connected by a wire 121 to contact member 122. Under this set of conditions, when contact arm 105 engages contact 104 on the meter as air continues to flow through the meter, relay 108 is energized momentarily to cause relay arm 109 to make contact with member 122. Consequently, current momentarily flows through the winding 82 of magnet 80 and causes pen 87 to be drawn momentarily to the right as armature 84 is momentarily lifted. Thus pen 87 makes a short lateral mark 120a to the right of the mark 115 (see Fig. 1) for each cubic foot of air passing through the meter.

The marks 131 on the extreme left of chart paper strip 12 represent the graph made by the $SO_2$ recorder pen 132, the laterally extending marks 133 indicating the change from one set of absorbers to another set of absorbers in the $SO_2$ absorption apparatus. This aspect of the apparatus is known to those skilled in the art and a detailed discussion is deemed to be superfluous. Suffice it to say, the recording instrument is in a known manner calibrated to indicate the $SO_2$ concentration in the air being tested. It is significant to note, however, that the graph 131 is correlated with the wind direction graph 119, the wind velocity graph 99 and the wind direction orientation graph 114, 115, the latter also serving to record the volume of air tested, the $SO_2$ content of which is indicated by graph 131.

It will be seen from the foregoing description that the invention provides a system whereby a running record may be made in the form of an automatically produced chart which will show for any particular time and for any period of time, the concentration of $SO_2$ in the atmosphere, the amount of air tested, the wind direction and the wind velocity. Such charts being valuable not only for current testing or for obtaining intelligence at a particular time are also particularly suitable for permanent records as the system can be operated for short or long periods with very little manual effort or personal attention.

While certain novel features of the invention have been disclosed and are pointed out in the claims, it will be understood that various omissions, substitutions and changes may be made by those skilled in the art without departing from the spirit of the invention comprehended by the annexed claims.

What is claimed is:

1. An apparatus for use with a record producing instrument for recording concentration of $SO_2$ in the atmosphere having means for supporting a record strip, means for moving said strip at a predetermined speed, means for recording $SO_2$ concentration, and a meter for measuring the amount of air tested which apparatus comprises a wind vane mounted for rotation, a first marking device to engage said strip and operative in response to the movement of said wind vane in either of its two 180° arcs of rotation about its axis of rotation, a second marking device to engage said strip and operative in response to rotation of said wind vane to record in which of the two said arcs said wind vane is operating at any given time, and means including an electromagnet connected with said meter to cause said second marking device also to record the amount of air measured by said meter.

2. A wind direction recording instrument which comprises means for supporting a record strip, means for moving said strip at a predetermined speed, a weather vane mounted for rotation in response to change in wind direction, a first marking device adapted to record its movement on said strip, means including a heart-shaped cam between said weather vane and first marking device to operate said marking device in response to rotation of said weather vane in either of its two 180° arcs of rotation about its axis of rotation, a second marking device adapted to record its movement on said strip, and means including a cam having a low cam track through 180° and a high cam track through 180° between said second marking device and said weather vane to cause said second marking device to record on said strip in which of its two 180° arcs said wind vane operates at a given time.

3. A wind direction recording instrument which comprises means for supporting a record strip, means for moving said strip at a predetermined speed, a weather vane mounted for rotation in response to change in wind direction, a shaft mounted for rotation in response to rotation of said weather vane, a first marking device adapted to record its movement on said strip, means including a cam having a heart-shaped cam track mounted on said shaft to operate said first marking device in response to rotation of said weather vane in either of its two 180° arcs of rotation about its axis of rotation, a second marking device adapted to record its movement on said strip, and a cam having a high and a low cam track section mounted on said shaft to cause said second marking device to record on said strip in which of said two 180° arcs said wind vane operates at a given time.

4. An apparatus for use with a record producing instrument having means for supporting a record strip and means for moving said strip at a predetermined speed which comprises, a wind vane mounted for rotation through 360° about its axis of rotation, a shaft rotatable in response to the rotation of said wind vane, a wind direction orientation cam and a wind direction cam rotatable in response to rotation of said shaft, a wind direction orientation marking device to engage and make a record on said strip, a wind direction marking device to engage and make a record on said strip, said wind direction orientation cam having a high and a low section cam track, said wind direction cam having a heart-shaped cam track, a cam lever engaging said orientation cam and arranged to cause operation of said wind direction orientation marking device to make one mark on said strip when said cam lever engages the low section of its cam and to make another mark on said strip when said cam lever engages the high section of its cam, and a cam lever engaging said heart-shaped cam to operate said wind direction marking device.

5. An apparatus for use with a record producing instrument for recording SO2 concentrations in the atmosphere having means for supporting a record strip, means for moving said strip at a predetermined speed and a meter for measuring the amount of air tested which apparatus comprises, a wind vane mounted for rotation through 360° about its axis of rotation, a shaft rotatable in response to the rotation of said wind vane, a wind direction orientation cam and a wind direction cam rotatable in response to rotation of said shaft, a wind direction orientation marking device to engage and make a record on said strip, a wind direction marking device to engage and make a record on said strip, said wind direction orientation cam having a high and a low section cam track, said wind direction cam having a heart-shaped cam track, a cam lever engaging said orientation cam and arranged to cause operation of said wind direction orientation marking device to make one mark on said strip when said cam lever engages the low section of its cam and to make another mark on said strip when said cam lever engages the high section of its cam, a cam lever engaging said heart-shaped cam to operate said wind direction marking device, and means connected with said meter to cause said wind direction orientation marking device also to make marks on said strip indicating the amount of air measured by said meter in addition to said mentioned marks.

6. In a system for recording wind direction simultaneously with recording of SO2 concentration in the atmosphere, a meter for measuring the amount of air tested, means for supporting a record strip upon which is recorded a graph indicating SO2 concentration, a weather vane mounted for rotation, a first cam operative in response to rotation of said weather vane, a first marking device operative in response to rotation of said first cam in either of the two 180° arcs of rotation of said weather vane about its axis, a second cam operative in response to rotation of said weather vane, a second marking device operative in response to rotation of said second cam to record on said strip marks to show in which of said arcs said weather vane operates at any time, said second marking device being operative to make marks indicating wind direction orientation and said first marking device being operatve to make a graph indicating wind direction, and means operative in response to the operation of said meter to cause said second marking device to make marks on said strip to indicate the amount of air passing through said meter.

7. Apparatus, for use with a record producing instrument for recording SO2 concentrations in the atmosphere having a record strip and means for moving said strip at a predetermined speed, to correlatively record wind velocity and direction with the SO2 concentration record on said strip, which apparatus comprises: first, second and third marking devices, a frame mounting said first, second and third marking devices, said first marking device being connected to an anemometer and operatively responsive thereto to record wind velocity on said record strip, a wind vane mounted for rotation through 360°, a wind orientation cam and a wind direction cam operative in response to rotation of said vane, said wind orientation cam being connected to said second marking device for recording on said strip which of two arcs of rotation said vane is operating in, and said wind direction cam being connected to said third marking device for recording the movement of said vane on said strip.

MOYER D. THOMAS.
JAMES O. IVIE.